(12) United States Patent
Abate et al.

(10) Patent No.: US 6,411,414 B1
(45) Date of Patent: Jun. 25, 2002

(54) WAVELENGTH DIVISION MULTIPLEXING WIRELESS OPTICAL LINK

(75) Inventors: Joseph Anthony Abate, Lafayette; James John Auborn, Warren, both of NJ (US); Gerald Nykolak, Long Beach, NY (US); Herman Melvin Presby, Highland Park, NJ (US); Gerald E. Tourgee, Convent Station, NJ (US); Paul F. Szajowski, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/195,553

(22) Filed: Nov. 19, 1998

(51) Int. Cl.[7] .............................................. H04B 10/00
(52) U.S. Cl. ........................ 359/154; 359/124; 359/180
(58) Field of Search ................................. 359/154, 124, 359/180, 189, 160

(56) References Cited

U.S. PATENT DOCUMENTS 6,016,212 A * 1/2000 Durant et al. ................ 359/124
6,239,888 B1  5/2001 Willebrand .................. 359/118

* cited by examiner

*Primary Examiner*—Thomas Mullen
(74) *Attorney, Agent, or Firm*—Harness, Dickey & Pierce, P.L.C.

(57) ABSTRACT

An optical wireless link using wavelength division multiplexing. A transmitter transmits an optical signal to a receiver over a free space medium, such as the atmosphere. The transmitter uses single mode optical structures between the lasers and the transmitting telescope, including one or more erbium-doped single mode fiber amplifiers.

17 Claims, 4 Drawing Sheets

WAVELENGTH DIVISION MULTIPLEXING WIRELESS OPTICAL LINK

FIELD OF THE INVENTION

The invention is directed toward the field of optical communications, more particularly to wireless optical communications, and even more particularly to wavelength division multiplexed wireless optical communication.

BACKGROUND OF THE INVENTION

Some optical-signal-based communication systems are wireless, i.e., the medium in which the signal propagates is free space. In contrast to radio frequency (RF) communication, optical wireless has a disadvantage, in some respects, of being extremely directional. This requires very precise alignment between the transmitting telescope and the receiving telescope. An advantage of the extremely directional nature of wireless optical communication is that it is secure. To intercept the signal, it is necessary to be on the path of the transmitted light.

Another advantage of the optical wireless link is that the optical portion of the spectrum is not a form of communication regulated by the government. In other words, no license is needed to operate the transmitter and receiver. In contrast, such a license would be necessary for a comparable radio frequency (RF) wireless communication system.

Some optical-signal-based communication systems are limited to the use of a transmission medium of optical waveguides. Wireless optical communication has an advantage over optical fiber-based communication in that the wireless communication does not require a physical connection between the source of the signal and the device that receives the signal. In a setting such as an urban area like New York City, it can be very difficult to install a physical connection between buildings, especially if a street and/or one or more other buildings separate the buildings. A wireless optical link only requires an unobstructed path between the transmitter and the receiver. In the New York City situation, this is much easier to achieve than the installation of a physical link. The lack of a physical connection can also be advantageous where temporary high capacity data links between computing installations are required, such as in an emergency relief operation for a disaster area or in military operations.

A known wireless optical link includes a transmitting telescope, for forming a transmitted beam, aimed at a second telescope that collects the received beam. The medium in which the beam propagates is the atmosphere. Typically, the optical signal to be transmitted is emitted from a semiconductor laser. The emitting facet of the laser lies at the front focal plane of the transmitting telescope. Conversely, the received signal is typically collected on a photodetector that lies at the back focal plane of the receiving telescope.

The prior art transmitter uses only a single wavelength of light. Due to the great difficulty of implementing single wavelength operation, multiple wavelength operation did not develop.

The prior art transmitting telescope and the receiving telescope are precisely aimed at one another, again, because optical signals are extremely directional. Atmospheric diffraction effects can cause the transmitted beam to vary in intensity (scintillation) and to deviate from the carefully aimed path (beam wander). To compensate for this problem, multiple element (i.e., multiple apertures) transmitting telescopes have been used. The multiple apertures represent redundant sources of the optical signal. Although each of the signals from a multiple aperture telescope may be attenuated by optical diffraction effects, the multiple attenuated signals represent an equivalent signal strength to a non-attenuated single signal.

Multiple-aperture receiving telescopes are also used in the prior art wireless optical communication system. This provides a greater optical signal collection area. The signal collected by each receiving element (or aperture) is sent down a respective optical fiber and an Nx1 optical coupler is used to flannel the collected optical signals from these fibers into a single output fiber. Conversely, each transmitting element or aperture in the multiple aperture transmitting telescope is supplied with an optical signal by a respective emitter coupled to a respective optical fiber.

The prior art utilized multiple mode (multimode) optical sources due to their much greater availability and much lower cost. Consequently, the prior art transmitter is configured for multimode light propagation within its optical structures. As a result, the prior art optical wireless link has limited power, resulting in limited transmission distances. Also, the prior art optical wireless link is limited in bandwidth, which for the single wavelengths has attained a maximum of about 2.5 giga bits per second (Gbits/sec).

Despite the desirability of the wireless optical link, the prior art optical wireless technique is still not satisfactory because it is limited in bandwidth. More importantly, though, the prior art wireless optical link is not powerful enough to permit a useful transmission distance. For example, the prior art wireless optical link is not powerful enough to overcome bad weather, such as rain, fog or snow. Also, the prior art optical wireless link cannot overcome the problems of scintillation.

SUMMARY OF THE INVENTION

It is an advantage of the invention that the problems of the prior art, in particular insufficient power and insufficient bandwidth, are overcome. In overcoming these and other problems, the invention (among other things) provides techniques for multiplexing and demultiplexing a free space, bi-directional laser communication data link for single channel and wavelength division multiplexing (WDM) applications.

The invention is, in part, a recognition that the output power of the transmitter can be increased by using single mode optical structures between the lasers and the focal plane of the transmitting telescope, regardless of whether the wireless medium is a multiple mode (multimode) medium. Such single mode optical structures preferably include one or more single mode optical amplifiers to provide the necessary gain to the optical signal. Also, to provide the needed increase in bandwidth, the invention sends information over multiple wavelengths, rather than the single wavelength of the prior art optical wireless technique.

The present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention and wherein.

DETAILED DESCRIPTION OF THE PREFERRED EMBODIMENTS

Figure 1:
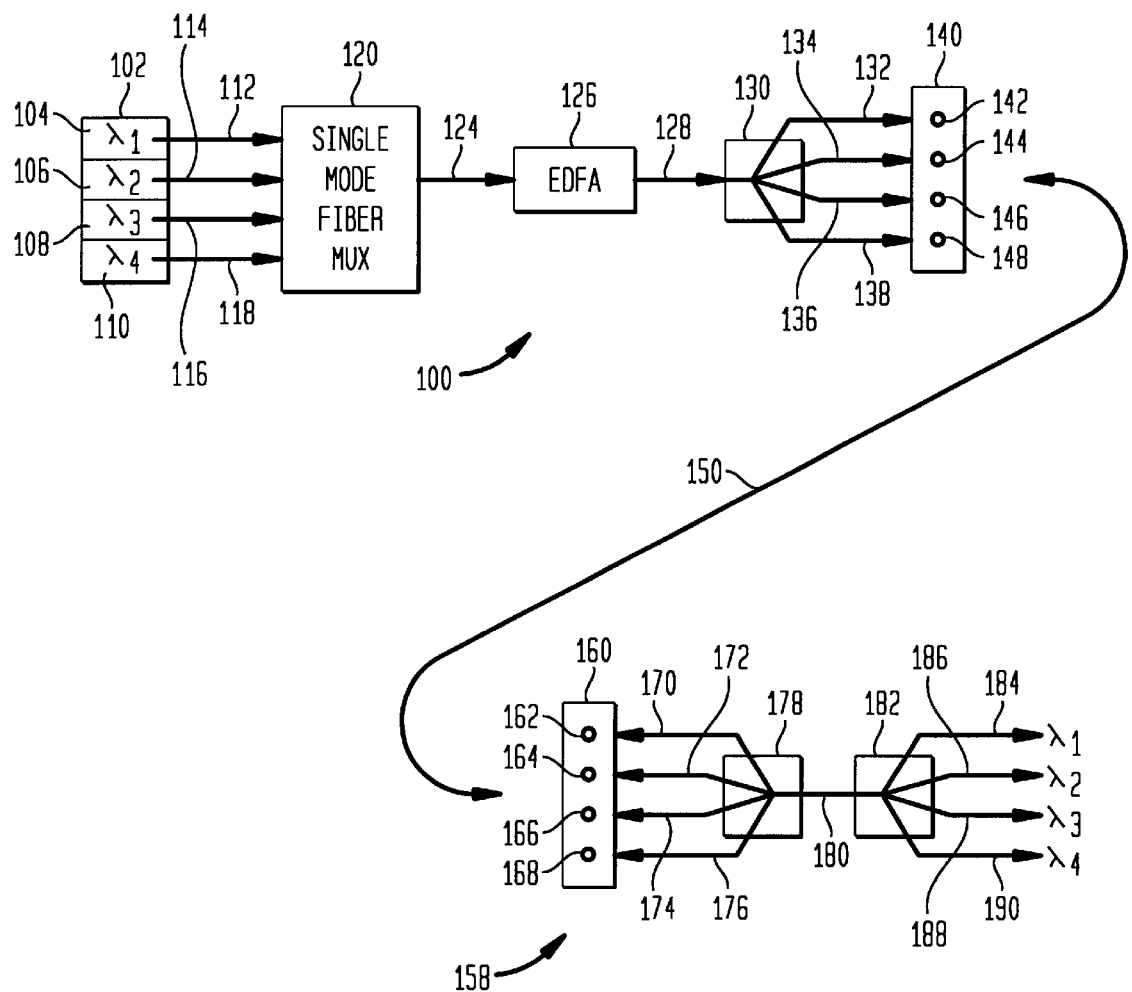
FIG. 1 is a block diagram of a first embodiment according to the invention.

FIG. 1 is a block diagram of a first embodiment according to the invention. FIG. 1 depicts an optical transmitter 100 and an optical receiver 158.

The optical transmitter 100 includes a source 102 of multiple wavelengths of light. Preferably, the source 102 is formed of four lasers 104, 106, 108 and 110. Each of the lasers is a distributed feedback (DFB) laser, e.g., that operates in a range of light between 1300 and 1700 nanometers (nm), preferably around 1550 nm (such as 1530 nm, 1535 nm, 1540 nm and 1545 nm) or around 1300 nm, such that each of the lasers 104, 106, 108 and 110 produces a unique wavelength within the amplification band of the associated amplifier (to be discussed further below).

Each of the DFB lasers 104, 106, 108 and 110 is connected to a single mode fiber multiplexer 120 via single mode optical fibers 112, 114, 116 and 118, respectively. The multiplexer 120 multiplexes together the four optical signals, $\lambda_1, \lambda_2, \lambda_3, \lambda_4$. The multiplexer 120 multiplexes the signals together onto a single mode optical fiber 124 which guides the multiplexed signal to an optical amplifier 126.

The optical amplifier 126 is preferably a high power erbium-doped fiber amplifier (EDFA) for operation around 1550 nm. The wavelengths $\lambda_1, \lambda_2, \lambda_3, \lambda_4$ are selected to be within the erbium amplification band. The EDFA preferably produces at least 20 dBm of optical power at each of the wavelengths of interest, i.e., at $\lambda_1, \lambda_2, \lambda_3, \lambda_4$. Alternatively, for operation around 1300 nm, it is preferred to use one or more Raman gain single mode optical amplifiers.

The amplified optical signal from the EDFA 126 is guided to a single mode optical splitter 130 via a single mode optical fiber 128. The splitter 130 splits the single optical path of the amplified signal 128 into four separate paths 132, 134, 136 and 138. These. paths, 132, 134, 136 and 138, lead to apertures 142, 144, 146 and 148, respectively, in the transmitting telescope 140. The paths 132, 134, 136 and 138 terminate at the focal plane of the objective optic, e.g., a lens, for the telescope 140.

The receiver 158 includes a receiving telescope 160. The transmitting telescope 140 and the receiving telescope 160 are precisely aligned because of the extremely directional nature of optical signals. Depending upon the vibrational stability of the structure upon which the transmitter is mounted, automatic tracking alignment can be used. The optical path between the transmitting telescope 140 and the receiving telescope 160 is noted by item number 150. In actuality, the path 150 is a straight line between the transmitting telescope 140 and the receiving telescope 160. However, for simplicity and compactness of the drawing, the path 150 has not been depicted as a straight line. For signals transmitted through the atmosphere, the path 150 is effectively a multimode path.

The receiver 158 also includes a multimode coupler 178 for having four multimode optical paths 170, 172, 174 and 176 corresponding to the four apertures, 162, 164, 166 and 168 of the receiving telescope 160. The receiving facets of the coupler 178 are located at the focal plane of the objective optic, e.g., a lens, of the receiving telescope 160. The coupler 178 combines the four optical signals on the paths 170, 172, 174 and 176 into one multimode optical fiber 180 that connects to a multiple mode demultiplexer 182. The demultiplexer 182 demultiplexes, or separates, the multiplexed optical signal on the single optical fiber 180 into four discrete optical signals, each of which has a single wavelength, $\lambda_1, \lambda_2, \lambda_3$, and $\lambda_4$ on the discrete multimode optical paths 184, 186, 188 and 190, respectively.

The single mode fiber multiplexer 120 is preferably formed of a grating the widths of which are appropriately sized for the wavelengths being used. Alternatively, the multiplexer 120 could be formed from waveguide arrays. The grating is more efficient than the array of waveguides, i.e., it attenuates the optical signal to a lesser degree.

The multimode fiber demultiplexer 182 is preferably formed using a grating, the widths of which are, again, appropriately sized for the wavelengths being used. Alternatively, the demultiplexer 182 could be formed from a combination of filters, which are less efficient, i.e., which attenuate the received signal to a greater degree than the grating.

Figure 2:
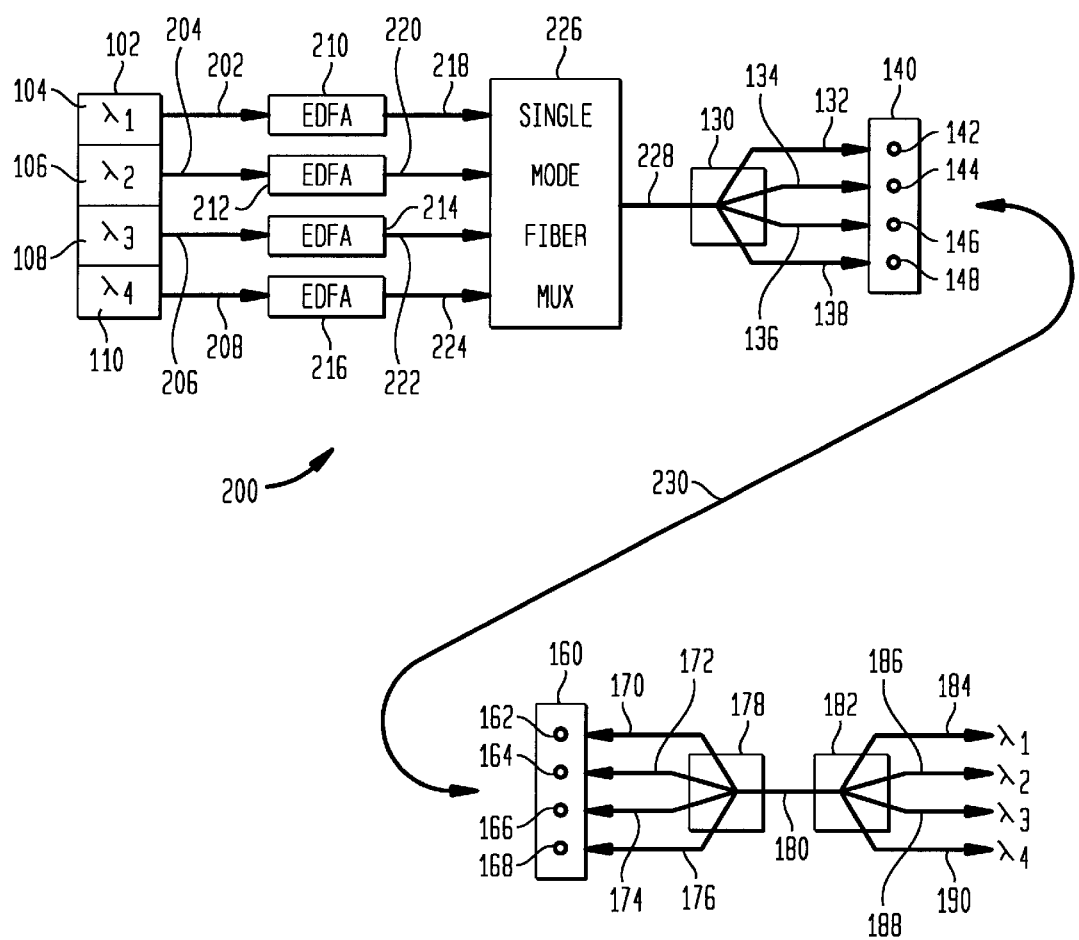
FIG. 2 is a block diagram of a second embodiment according to the invention.

FIG. 2 depicts a block diagram of a second embodiment according to the invention. Aspects of the second embodiment that differ from the first embodiment have been denoted with item numbers between 200 and 230. In general, FIG. 2 differs from FIG. 1 in terms of the transmitter 200, where the optical signals are amplified before they are multiplexed, rather than after they are multiplexed as in FIG. 1.

In FIG. 2, single mode optical fibers 202, 204, 206 and 208 guide the wavelengths $\lambda_1, \lambda_2, \lambda_3$, and $\lambda_4$ from the lasers 104, 106, 108 and 110 to corresponding EDFAs 210, 212, 214 and 216, respectively. The amplified optical signals from the EDFAs 210, 212, 214 and 216 are guided to a single mode optical fiber multiplexer 226 via single mode optical fibers 218, 220, 222 and 224, respectively. The multiplexer 226 multiplexes the signals together and the multiplexed signal is guided to the single mode splitter 130 via a single mode optical fiber 228. A straight path 230 (which is not depicted as a straight line in FIG. 2, for simplicity) connects the transmitting telescope 140 to the receiving telescope 160, e.g., through the atmosphere (air).

Comparing FIG. 1 versus FIG. 2, FIG. 2 achieves greater gain because there are four amplifiers rather than one. However, the second embodiment of FIG. 2 is more expensive because of the three additional EDFAs involved.

Figure 3:
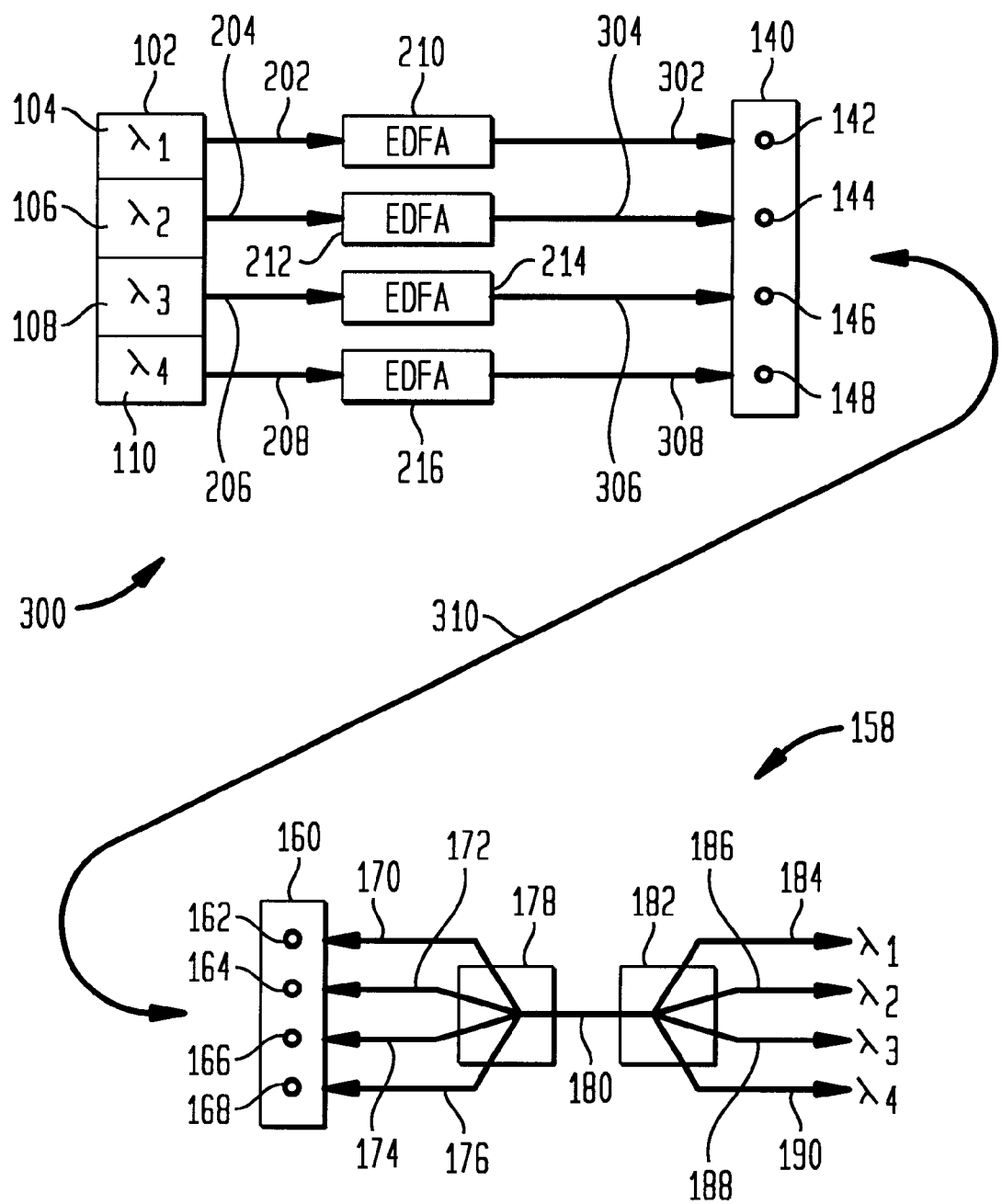
FIG. 3 is a block diagram of a third embodiment according to the invention.

FIG. 3 depicts a block diagram of a third embodiment according to the invention. Differences between the embodiments of FIGS. 1 and 2 have been denoted by item numbers between 300 and 310.

The transmitter 300 in FIG. 3 is a simplification of the transmitter 200 in FIG. 2. In FIG. 3, instead of using a multiplexer 226 to multiplex the signals in the four single mode optical fibers 218, 220, 222 and 224 into one single mode optical fiber 30 228, the outputs of the EDFAs 210, 212, 214 and 216 are individually and directly guided to the apertures 142, 144, 146 and 148 of the transmitting telescope 140 via single mode optical fibers 302, 304, 306 and 308, respectively. The emitting facets of the fibers 302, 304, 306 and 308 are located at the focal plane of the transmitting telescope 140. A straight path 310 (which is not depicted as a straight line in FIG. 3, for simplicity) connects the transmitting telescope 140 to the receiving telescope 160. FIG. 3 has an advantage over FIG. 2, in terms of cost, because the multiplexer 226 is eliminated.

Figure 4:
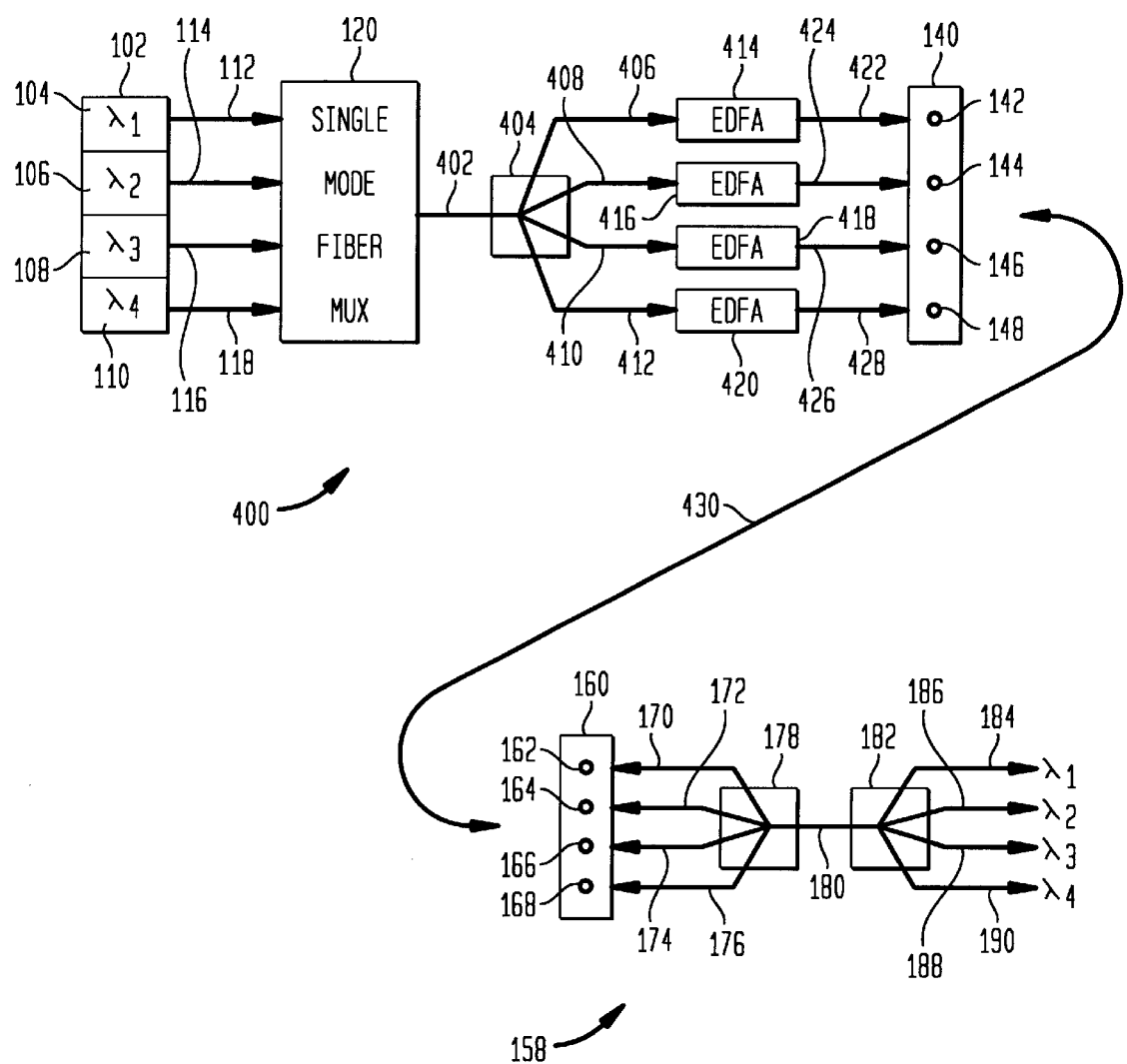
FIG. 4 is a block diagram of a fourth embodiment according to the invention.

FIG. 4 depicts a block diagram of a fourth embodiment according to the invention. Differences between the embodiments of FIGS. 1–3 have been denoted with item numbers between 400 and 430.

The transmitter 400 in FIG. 4 differs primarily from the transmitter 100 of FIG. 1 in that the amplification takes place after the multiplexed signal is split. A single mode optical fiber 402 guides the multiplexed optical signal from the multiplexer 120 to a single mode splitter 404, which splits the signal onto four discrete single mode optical fiber paths 406, 408, 410 and 412. The optical paths 406, 408, 410 and 412 guide the multiplexed optical signal to the EDFAs 414, 416, 418 and 420, respectively.

The amplified optical signals from the EDFAs 414, 416, 418 and 420 are guided to the apertures 142, 144, 146 and 148 of the transmitting telescope 140 via single mode optical fibers 422, 424, 426 and 428, respectively. The emitting facets of the fibers 422, 424, 426 and 428 are located at the focal plane of the transmitting telescope 140. A straight path 430 (which is not depicted as a straight line in FIG. 4, for simplicity) links the transmitting telescope 140 to the receiving telescope 160.

FIG. 4 has an advantage over FIG. 1 in that it is capable of greater gain because it has four amplifiers rather than one. However, the embodiment of FIG. 4 has a cost disadvantage in that it requires three more amplifiers than does the embodiment of FIG. 1.

The telescope 140 has been described as a multiple aperture telescope. However, a single aperture telescope could be used. Similarly, the receiving telescope 160 has been described as a multiple aperture telescope. Again, a single aperture receiving telescope could be used.

The medium providing the wireless link between the transmitting telescope 140 and a receiving telescope 160 has been described as the atmosphere. However, the medium could also be the vacuum of outer space. If the medium is outer space, then the optical components of the receiver 158 would be single mode optical structures because the vacuum of outer space would not exhibit significant diffraction effects, i.e., it would act as a single mode medium rather than as a multiple mode medium.

The transmitting telescope 140 and the receiving telescope 160 are bi-directional devices. Thus, an implementation of the optical wireless link according to the invention could have both transmitting and receiving hardware using the transmitting telescope 140 and receiving and transmitting hardware using the receiving telescope 160:

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical transmitter for a wireless communications link, said optical transmitter comprising:
 a source of multiple wavelengths of light;
 a single mode optical path structure, a first end of which is connected to said multi-wavelength source; and
 a transmitting telescope including an objective optic, to transmit said multiple wavelengths of light into space, a second end of said single mode optical path structure being arranged at a focal plane of said objective optic of said telescope.

2. The transmitter of claim 1, wherein said single mode optical path structure includes at least one single mode optical fiber.

3. The transmitter of claim 1, wherein said optical path structure includes an optical amplifier.

4. The transmitter of claim 3, wherein said optical amplifier is an erbium-doped fiber amplifier.

5. The transmitter of claim 3, wherein said single mode optical path structure includes one optical amplifier for each one of said multiple wavelengths.

6. The transmitter of claim 5, wherein said source has a separate output for each one of said multiple wavelengths, and said single mode optical path structure has discrete single mode optical paths between said outputs of said source and the multiple optical amplifiers, respectively.

7. The transmitter of claim 6, wherein said single mode optical path structure includes a single mode fiber multiplexer, said discrete single mode optical paths continue through said multiple optical amplifiers to an input of said multiplexer, said multiplexer providing an output on a discrete multiplexed optical path.

8. The transmitter of claim 7, wherein said single mode optical path structure further includes a single mode path splitter for splitting said discrete multiplexed optical path into a plurality of transmission channels, said telescope including one aperture for each transmission path.

9. The transmitter of claim 6, wherein said discrete single mode optical paths continue directly from said optical amplifiers to a plurality of transmitting apertures, respectively, in said transmitting telescope.

10. The transmitter of claim 5, wherein said source has a separate output for each one of said multiple wavelengths;
 wherein said single mode optical path structure includes
  a single mode fiber multiplexer,
  said optical path structure having discrete single mode optical paths between said outputs of said source and inputs to said multiplexer, said multiplexer providing an output on a discrete multiplexed optical path.

11. The transmitter of claim 5, wherein said single mode optical path structure includes:
 a single mode path splitter for splitting said discrete multiplexed optical path into a plurality of transmission channels, said telescope including one aperture for each transmission path.

12. The transmitter of claim 11, wherein said optical amplifier forms a part of said discrete multiplexed optical path.

13. The transmitter of claim 11, wherein said optical amplifier is one of a plurality of optical amplifiers such that a part of each transmission path is formed by one of said plurality of optical amplifiers, respectively.

14. The transmitter of claim 1, wherein said source of multiple wavelengths includes a plurality of lasers.

15. The transmitter of claim 14, wherein each one of said plurality of lasers operates in a range of light between 1300 and 1700 nanometers (nm).

16. The transmitter of claim 15, wherein each of said plurality of lasers operates at a wavelength around 1300 nm or each operates at a wavelength around 1550 nm.

17. An optical communications system having a wireless link, said system comprising:
 an optical transmitter including
  a source of multiple wavelengths of light,
  a single mode optical path structure, a first end of which is connected to said multi-wavelength source, and a transmitting telescope, including an objective optic, to transmit said multiple wavelengths into space, a second end of said single mode optical path structure being arranged at a focal plane of said objective optic of said transmitting telescope; and an optical receiver including
- a receiving telescope including an objective optic,
- a second optical path structure, a first end of which is arranged at a focal plane of said objective optic of said receiving telescope,
- wherein said receiving telescope is operable to receive, from said space, an optical signal having said multiple wavelengths, and
- a demultiplexer, arranged at a second end of said second optical path structure, to provide a discrete optical signal corresponding to each of said multiple wavelengths.

* * * * *